United States Patent [19]
Maley

[11] 3,742,839
[45] July 3, 1973

[54] BATTERY-OPERATED ROTISSERIE WITH DETACHABLE SPIT SUPPORTS

[76] Inventor: Joseph P. Maley, 1915 E. Wallings Road, Broadview Heights, Ohio 44147

[22] Filed: Feb. 7, 1972

[21] Appl. No.: 223,952

[52] U.S. Cl. .............................. 99/421 HV, 126/25
[51] Int. Cl. ............................................ A47j 37/04
[58] Field of Search..................... 99/421, 419, 420; 310/83; 320/2, 56; 126/9, 25

[56] References Cited
UNITED STATES PATENTS

| | | | |
|---|---|---|---|
| 1,888,616 | 11/1932 | Bocchino ....................... | 99/421 HV |
| 2,849,948 | 9/1958 | Rowley ......................... | 99/421 HV |
| 3,109,132 | 10/1963 | Witte ............................... | 320/56 X |
| 3,184,775 | 5/1965 | Downey et al...................... | 320/2 X |
| 3,343,192 | 9/1967 | Goldstein et al..................... | 320/2 X |
| 3,356,012 | 12/1967 | Rosen ....................... | 99/421 HV X |
| 3,369,294 | 2/1968 | Shaw et al. ......................... | 320/2 X |
| 3,387,555 | 6/1968 | Moran............................. | 99/421 HV |

*Primary Examiner*—John Petrakes
*Assistant Examiner*—Arthur O. Henderson
*Attorney*—Walter Maky

[57] ABSTRACT

A rotisserie characterized in the provision of a pair of vertical spit support strips having screw clamps at their lower ends for securing on the rim of a barbecue grill firebox (or optionally to the upper ends of wood stakes driven into the ground), said support strips being provided with at least three vertically spaced apart inverted L-shaped slots including horizontal portions open at one edge of each support strip and vertical portions extending downwardly from the respective horizontal portions, the bottom or middle slot of one support strip constituting a support for a self-contained battery-operated spit drive unit which has its spit drive shaft extending through the vertical portion of a slot above that which supports the drive unit. The end of the spit remote from the drive unit is supported by the bottom of the vertical portion of the middle or top slot in the other support strip. A further, characterizing feature of the rotisserie herein is that the adjustable meat holders on the spit are of simple form having straight divergent prongs embedded in the meat being barbecured.

4 Claims, 4 Drawing Figures

PATENTED JUL 3 1973 3,742,839
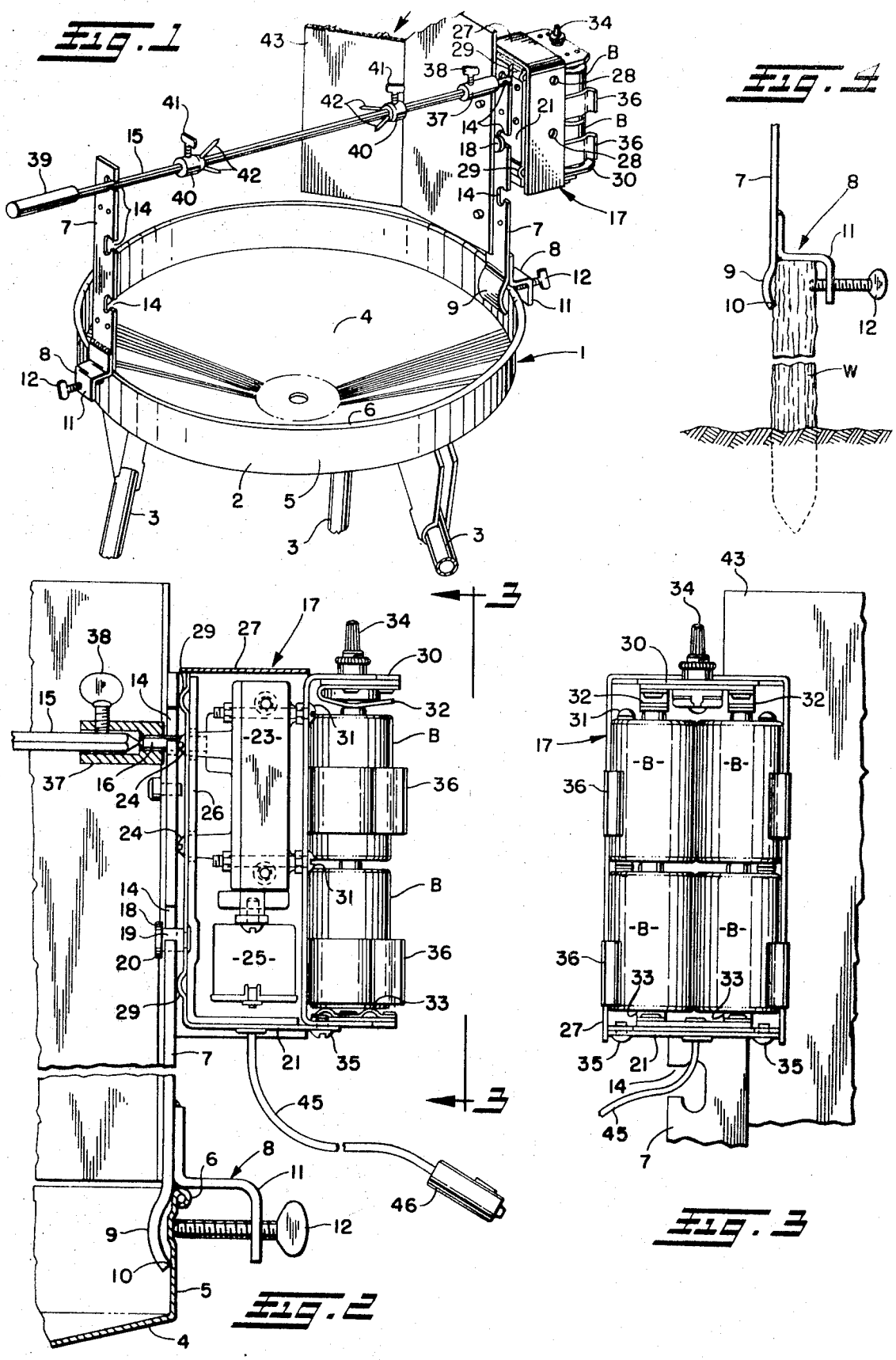

BATTERY-OPERATED ROTISSERIE WITH DETACHABLE SPIT SUPPORTS

BACKGROUND OF THE INVENTION

In known barbecue grills equipped with rotisseries, they are usually provided with sheet metal hoods attached to the firebox and have provision for mounting of a spit and 120 V.A.C. drive unit therefor. Hence, to use such rotisserie requires that an A.C. outlet be located nearby and additionally there is the ever present danger of electrical shock.

In known rotisseries, the meat holders which are adjustably mounted on the spit usually comprise bushings to which are welded U-shaped wires having parallel tines adapted to be inserted into the meat.

SUMMARY OF THE INVENTION

A principal object of the present invention is to provide a battery-operated rotisserie in which the spit supports may be detachably secured to the rim of any barbecue grill firebox whether it be circular, rectangular or other shape, and even where a firebox having an upstanding rim is not available the rotisserie may be secured to stakes pounded in the ground for supporting the spit at a desired level of the heat source whether on the ground itself or in some other form of firebox which does not have an upstanding rim.

Another object of this invention is to provide a battery-operated spit drive unit in which the drive motor and speed reducer are protected from the intense heat of the charcoal fire and in which the batteries are exposed and mounted on the rear side of the drive unit and are exposed for air cooling in addition to being remote from the heat source thus to enhance battery life and to prevent corrosion while enabling battery replacement in a matter of a few second's time.

It is another object of this invention to provide vertically disposed spit supports which have novel screw clamps arranged to stably support said supports in vertical position with the clamp having sharp corners or edges for high pressure frictional engagement with the inside surface of the firebox rim and with the end of the clamp screw indenting the outside wall of the firebox rim. Furthermore the top edge of the firebox rim engages the flat throat of the clamp.

It is another object of this invention to provide a drive unit housing which has a ribbed configuration engaging one of the spit supports in limited line contact engagement to provide air spaces between the housing and the spit support and, in addition, heat insulating material is disposed in the housing to additionally protect the motor and speed reducer from intense heat.

It is yet another object of this invention to provide a novel means for detachably securing the drive unit to one of the spit supports through the expedient of a headed mounting member disposed in the bottom of an inverted L-shaped slot in the spit support, the shank of the headed fastener resting on the bottom of the vertical portion of the slot and the head thereof being engaged with one side of the vertical support while the drive unit is engaged with the other side of the spit support, the drive shaft of the spit drive unit being in close proximity to the bottom of another inverted L-shaped slot but out of engagement therewith so that the rotation of the drive shaft is not impeded except by the other end of the spit which rests on the rounded bottom of an inverted L-shaped slot in the other spit support.

The rotisserie herein is still further characterized in that a wind deflector plate is detachably secured to one of the spit supports to keep wind away from the meat which is being barbecued and further to deflect the wind to assist in keeping the spit drive unit cool.

A further characterizing feature of the rotisserie herein is that the adjustable meat holders on the spit are of simple form having straight divergent prongs embedded in the meat to be barbecued.

Other objects and advantages of the present invention will appear hereinafter.

BRIEF DESCRIPTION OF THE DRAWING

FIG. 1 is a fragmentary perspective view of a barbecue grill to which the present battery-operated rotisserie is secured in operative relation;

FIG. 2 is an enlarged side elevation view on enlarged scale and partly in cross-section showing how the battery-operated spit drive unit is supported by one spit support strip and how the clamp at the lower end of the spit support strip firmly secures the rotisserie to the upstanding rim of the barbecue grill firebox;

FIG. 3 is a rear elevation view as viewed along the line 3—3, FIG. 2; and

FIG. 4 is a view showing how the spit supports may be secured to a wood stake or the like embedded in the ground to provide a rotisserie in connection with charcoal fires built on the ground or in connection with fireboxes which do not have an upstanding rim to which the spit supports may be clamped.

DETAILED DESCRIPTION OF THE PREFERRED EMBODIMENTS OF THE INVENTION

As shown in FIG. 1, the barbecue grill 1 is of known form having a firebox 2 supported in elevated position above the ground by the legs 3, said firebox 2 having a bottom 4 on which fuel, such as charcoal briquettes, is supported and having an upstanding rim 5 with a rolled upper side 6. Although the firebox herein is shown as being of circular form, it may be of rectangular or other form as well known so long as it has the upstanding rim 5 to which the spit support strips 7 herein may be detachably secured.

Secured to opposite sides of the rim 5 of the firebox 2 are vertically disposed spit support strips 7 each of which has a screw clamp 8 at its lower end which, as best shown in FIG. 2, comprises a curved or bent lower end 9 with a relatively sharp edge 10 to make high pressure frictional engagement with the inside wall of the firebox rim 5 and in the case of a circular firebox 2 as shown, the sharp corners 10 of each support strip 7 will embed in the inside wall of the firebox rim 5. Secured to the outside of each support strip 7, as by welding, is an angular nut member 11 in which the thumbscrew 12 has threaded engagement, and as evident, when the thumbscrew 12 is tightened, the end thereof will indent the outside wall of the firebox rim 5 and the upper beaded edge 6 will engage the flat throat of the clamp 8 as shown so that the support strips 7 cannot rock to and fro as viewed in FIGS. 1 and 2. The angular nut member 11 also makes it possible to mount the support strips 7 on fireboxes which may be provided with wide flanges instead of the rolled edge 6 as herein shown. Moreover, the angular nut member 11 enables clamping of the support strips 7 as shown in FIG. 4 to the upper ends of wood stakes W or the like driven into the ground, and in that case, the edge 10 of each support strip 7 and the end of each thumbscrew 12 will be embedded in the stake W with the square upper end of the stake W engaging the flat angular portion of the nut member 11.

Each spit support strip 7 has a plurality of vertically spaced apart inverted L-shaped slots 14 which are open at one edge of the support strip 7, the slot 14 openings being of width sufficient to pass therethrough the spit 15 and the drive shaft 16 of the battery-operated spit drive unit 17.

The support for the drive unit comprises a holder 18 having a shank 19 which passes through the opening of the L-shaped slot 14 below that through which the drive shaft 16 passes and the head 20 of said retainer engages the inside face of the spit support strip 7, the shank 19 resting on the rounded bottom of said L-shaped slot 14.

The drive unit 17 comprises an L-shaped housing section 21 to which the speed reducer 23 is secured as by means of screws 24. The battery-operated motor 25 is secured to the lower end of the speed reducer with the motor drive shaft coupled to the input shaft of the speed reducer 23. Said speed reducer 23 may be of familiar form comprising a worm and spur gear drive to obtain for example a 500:1 speed reduction between its input-spit drive shafts. The inside wall of the housing section 21 is lined with asbestos 26 or like heat insulating material and covering the top and sides of the motor 25 and speed reducer 23 is a housing section 27 secured as by screws 28, said housing sections 21 and 27 preferably being made of non-rusting material such as aluminum. The drive unit housing assembly comprising the sections 21 and 27 forms a box-like unit in which the motor 25 and speed reducer 23 are securely mounted. The section 21 has horizontal ribs 29 which are essentially in line contact with the spit support strip 7 and has riveted thereto the holding member 18.

The battery holder and switch mounting member 30 comprises a piece of aluminum secured by screws 31 to the speed reducer 23 to close the box-like housing for the motor-speed reducer and has top and bottom flanges provided with electrical contacts 32 and 33 and the upper flange has mounted thereon the on-off switch 34 for energizing and de-energizing the motor 25, and the bottom flange is secured to the bottom leg of the housing section 21 by means of the screws 35. Said battery holder 30 is provided with spring clips 36 to hold the batteries B in place as shown, and to permit ready removal and replacement of the batteries B. Preferably the battery holder 30 exposes the batteries B as shown so that they may be maintained cool by ambient air and being on the side of the drive unit housing 21–27 away or remote from the firebox 2, the heating thereof by the charcoal briquettes is minimized. Such exposure of the batteries B prolongs the life thereof and prevents corrosion thereof.

The speed reducer output shaft 16 has press-fitted or otherwise permanently mounted thereon a spit receiving bushing 37 and has a thumbscrew 38 to secure the pointed end of the spit 15 thereto for driving the spit 15 which extends from the bushing 37 past the L-shaped slot 14 in the spit support strip 7. Preferably the end of the spit 15 has secured thereto a handle as of wood 39 or the like to serve as a heat insulator so that the spit 15 may be readily handled. Meat holders 40 are adjustably mounted on the spit 15 as by means of the thumbscrews 41 and each comprises two diverging pointed prongs 42 which are adapted to be embedded in the meat to be barbecued. By reason of the divergent relation of the prongs 42, the meat is firmly held to rotate in unison with the spit 15 as it is driven by the drive unit 17.

Detachably secured to the spit support strip 7 which carries the drive unit 17 is a wind deflector plate 43 and the entire unit is preferably turned in a direction so that wind coming from the direction indicated by the arrow is precluded from blowing across the meat which is being barbecued and at the same time the wind is deflected to flow across the dirve unit 17 to cool the batteries B and also the drive motor 25 and speed reducer 23 housing 21–27.

In addition to, or in lieu of the batteries B, the motor 25 may be provided with a cord 45 having a plug 46 adapted to be plugged into an automobile cigarette lighter and as in connection with the batteries B there is no electric shock hazard and the rotisserie 1 is usable without regard to the availability of a 120 V. A.C. socket, and with battery B operation the rotisserie may be operated anywhere, and in connection with the 12 V. supply from an automobile battery, the rotisserie 1 may be used anywhere within the reach of the cord 45 and plug 46.

In cases where the firebox has upwardly flaring sides as in the case of a "HIBACHI" grill the support strips 7 may be firmly clamped on opposite ends of the firebox and, if necessary, the support strips 7 may be bent so as to be disposed vertically for mounting of the drive unit 17 in vertical position with the spit 15 extending horizontally from the drive unit 17 to the other spit support strip 7. As previously mentioned the present invention is applicable even when the charcoal fire is built right on the ground or in a firebox not having an upstanding rim. In such case, stakes W may be driven into the ground to appropriate height and the spit support members clamped thereto as shown in FIG. 4 for barbecuing meat, fowl, or other food items which are held on the spit 15 by the strips 7 and as well known in the art, food-containing baskets may be mounted on the spit 15 for rotation by the drive unit 17 to cook food in the basket.

I, therefore, particularly point out and distinctly claim as my invention:

1. A rotisserie for use in connection with a bed of charcoal briquettes and the like comprising separate vertical spit support strips having clamp means at their lower ends for clamping in fixed position relative to said bed of coals, each said spit support strip having a plurality of vertically spaced apart inverted L-shaped slots which are open at one side edge; a drive unit having a casing provided with a headed holder member, the shank of which passes laterally in one of said slots of one support strip and downwardly to rest on the bottom of the vertical portion of said slot, and having a drive shaft extending through the vertical portion of another slot above the slot in which said holder member is disposed; and a spit having one end detachably secured to said drive shaft and having its other end rotatably supported by a slot in the other of said support strips; said casing comprising an L-shaped member having a vertical leg to which said headed holder member is secured and a horizontal leg underlying said drive unit; said drive unit comprising a battery-powered electric motor and speed reducer unit secured to said vertical leg and having said drive shaft thereof extending through said another slot as aforesaid; said casing further comprising a channel-shaped battery holder having battery contacts inside its horizontal legs and having its vertical web secured to said drive unit; said vertical web having spring clips to removably retain battery means in engagement with said contacts.

2. The rotisserie of claim 1 wherein said casing further comprises an inverted U-shaped member having an upper portion overlying said drive unit and having downwardly depending portions straddling said drive unit and secured to opposite sides of said drive unit.

3. The rotisserie of claim 1 wherein each clamp means comprises an outwardly concave bent lower end having its lower and upper extremities disposed to engage the inner wall of the rim of a barbecue grill firebox, a nut member at the lower end portion of said strip spaced from said bent lower end and forming therewith a flat clamp throat to engage the upper end of said firebox rim, and screw means in threaded engagement with said nut member to engage and indent the outer wall of said firebox rim between such extremities.

4. A rotisserie for use in connection with a bed of charcoal briquettes and the like comprising separate vertical spit support strips having clamp means at their lower ends for clamping in fixed position relative to said bed of coals, each said spit support strip having a plurality of vertically spaced apart inverted L-shaped slots which are open at one side edge; a drive unit having a casing provided with a headed holder member, the shank of which passes laterally in one of said slots of one support strip and downwardly to rest on the bottom of the vertical portion of said slot, and having a drive shaft extending through the vertical portion of another slot above the slot in which said holder member is disposed; and a spit having one end detachably secured to said drive shaft and having its other end rotatably supported by a slot in the other of said support strips; and a vertically disposed wind deflector plate detachably secured to one edge of said one support strip to deflect wind away from food being barbecued on said spit and to provide air currents over said drive unit.

* * * * *